US006960110B2

(12) United States Patent
Hough

(10) Patent No.: US 6,960,110 B2
(45) Date of Patent: Nov. 1, 2005

(54) SECURE LIFE JACKET CONTAINER

(75) Inventor: Ray Hough, Mauden (GB)

(73) Assignee: BE Aerospace, Inc., Wellington, FL (US)

( * ) Notice: Subject to any disclaimer, the term of this patent is extended or adjusted under 35 U.S.C. 154(b) by 52 days.

(21) Appl. No.: 10/666,199

(22) Filed: Sep. 18, 2003

(65) Prior Publication Data

US 2005/0062319 A1    Mar. 24, 2005

(51) Int. Cl.[7] .............................................. B63C 9/00
(52) U.S. Cl. ...................................... 441/80; 206/807
(58) Field of Search ................... 441/80, 88; 206/278, 206/281, 459.1, 807; 297/188.08

(56) References Cited

U.S. PATENT DOCUMENTS

| | | | | |
|---|---|---|---|---|
| 3,623,683 A | * | 11/1971 | Bennett ................... | 244/122 A |
| 3,923,198 A | * | 12/1975 | Brochman ................ | 220/359.2 |
| 5,082,702 A | * | 1/1992 | Alband ..................... | 428/36.92 |
| 6,127,023 A | | 10/2000 | Marbler et al. | |
| 6,523,713 B1 | * | 2/2003 | Helms ....................... | 220/831 |
| 2003/0215162 A1 | * | 11/2003 | Switlik et al. ............... | 383/59 |
| 2004/0239435 A1 | * | 12/2004 | Hughes et al. .............. | 333/1.1 |

FOREIGN PATENT DOCUMENTS

| EP | 0 422 847 A | 4/1991 |
|---|---|---|
| WO | WO 03/024794 A | 3/2003 |

* cited by examiner

Primary Examiner—Andrew D. Wright
(74) Attorney, Agent, or Firm—Adams Evans P.A.

(57) ABSTRACT

A secure life jacket container assembly includes a hollow container defining a storage volume which receives a life jacket in a packed condition. A cover is attached to the container with a tamper-evident sealing material. Removal of the cover causes an irreversible change in the sealing material which provides an indication that tampering has occurred.

10 Claims, 7 Drawing Sheets

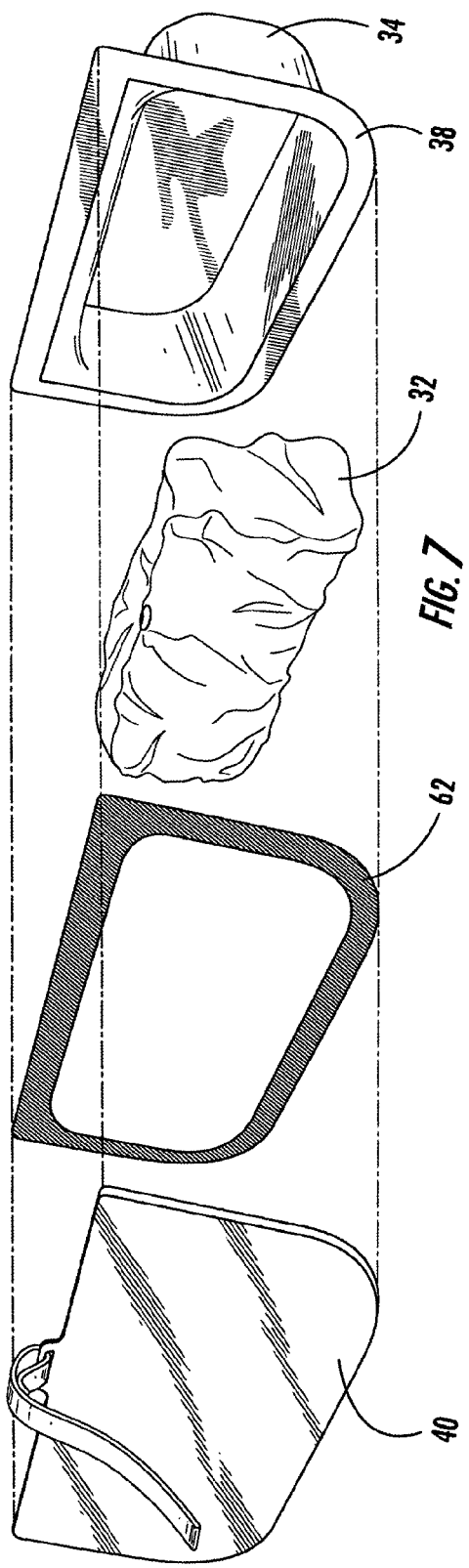
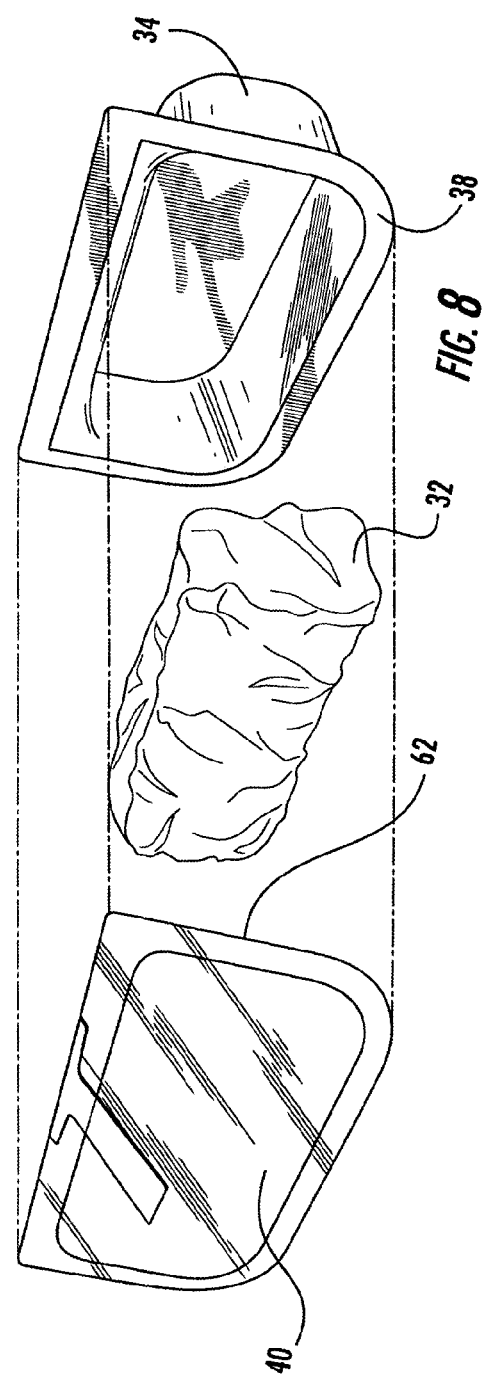

SECURE LIFE JACKET CONTAINER

BACKGROUND OF THE INVENTION

This invention relates generally to aircraft and more particularly to a life jacket container assembly for an aircraft seat unit. Commercial passenger aircraft include safety devices for use by passengers in case of a crash or ditching, for example flotation devices. Some flotation devices are simple members of buoyant material. Inflatable life jackets, packed in a folded condition, are also used. Such life jackets must be stored in a manner and location so that they will not be damaged during normal operations but can be easily and quick put into use during an emergency. Accordingly, many modern aircraft seating units include a pouch or container underneath the seat cushion where the life jacket is readily accessible to the passenger. Unfortunately, life jackets stored in such an easily accessible location are subject to tampering and theft. Furthermore, it is possible for terrorists to insert weapons or other illegal items into the container.

Accordingly, it is an object of the invention to provide a storage container for a life jacket which protects the life jacket until use.

It is another object of the invention to provide a storage container for a life jacket which permits observation and inspection of the stored life jacket and its identifying information.

It is another object of the invention to provide a storage container for a life jacket which discourages tampering and theft.

BRIEF SUMMARY OF THE INVENTION

These and other objects are met by the present invention, which according to one embodiment provides a tamper-evident container assembly, comprising a hollow container defining a storage volume, the container having an opening communicating with the storage volume. A cover is attached to the container and encloses the opening. A tamper-evident sealing material is disposed between and attached to the cover and the container, such that removal of the cover causes the sealing material to change in a manner to provide an observable indication that the cover has been removed.

According to another embodiment of the present invention, the open-ended container is a molded plastic one-piece assembly having an outwardly-extending lip disposed around the perimeter of the opening.

According to another embodiment of the present invention, the container includes a laterally-extending arcuate mounting flange extending from lip.

According to another embodiment of the present invention, the cover is a generally planar membrane.

According to another embodiment of the present invention, the cover includes a handle formed integrally therewith.

According to another embodiment of the present invention, the cover is a substantially rigid, planar cover.

According to another embodiment of the present invention, the cover has an upstanding edge disposed around its outer perimeter.

According to another embodiment of the present invention, the cover includes a handle attached thereto.

According to another embodiment of the present invention, the sealing material comprises a flexible material having first and second layers attached to the cover and to the container. Separation of the cover from the container causes the first and second layers to separate from each other while the first layer remains attached to the cover and the second layer remains attached to the container.

According to another embodiment of the present invention, separation of the first and second layers causes an indicia to be visible in at least one of the first and second layers.

According to another embodiment of the present invention, a tamper-evident life jacket container assembly, comprises a hollow container, having an opening, adapted for receiving a flotation device. A flotation device is disposed inside of the container. A tamper-evident sealing material is secured around the opening of the open-ended container. A cover id secured to the tamper-evident sealing material and encloses the open end of the container; such that removal of the cover causes the sealing material to change in a manner to provide an observable indication that the cover has been removed.

According to another embodiment of the present invention, a passenger seat frame assembly includes at least two spaced-apart leg modules; at least one transverse beam extending laterally between the leg modules, the beam having an external surface; and a tamper-evident container assembly attached to the seat frame. The container assembly includes a hollow container defining a storage volume and the container has an opening communicating with the storage volume. A cover is attached to the container and encloses the opening. A tamper-evident sealing material is disposed between and attached to the cover and the container, such that removal of the cover causes the sealing material to change in a manner to provide an observable indication that the cover has been removed According to another embodiment of the present invention, the container includes a laterally-extending arcuate mounting flange extending from the perimeter of the opening. The curved flange is disposed in contact with the transverse beam and conforms to the external surface of the transverse beam.

BRIEF DESCRIPTION OF THE DRAWINGS

The subject matter that is regarded as the invention may be best understood by reference to the following description taken in conjunction with the accompanying drawing figures in which:

FIG. 7 is an exploded perspective view showing the assembly of a life jacket container assembly;

FIG. 8 is an exploded perspective view showing the assembly of an alternate embodiment of the life jacket container assembly;

DETAILED DESCRIPTION OF THE INVENTION

Figure 1:
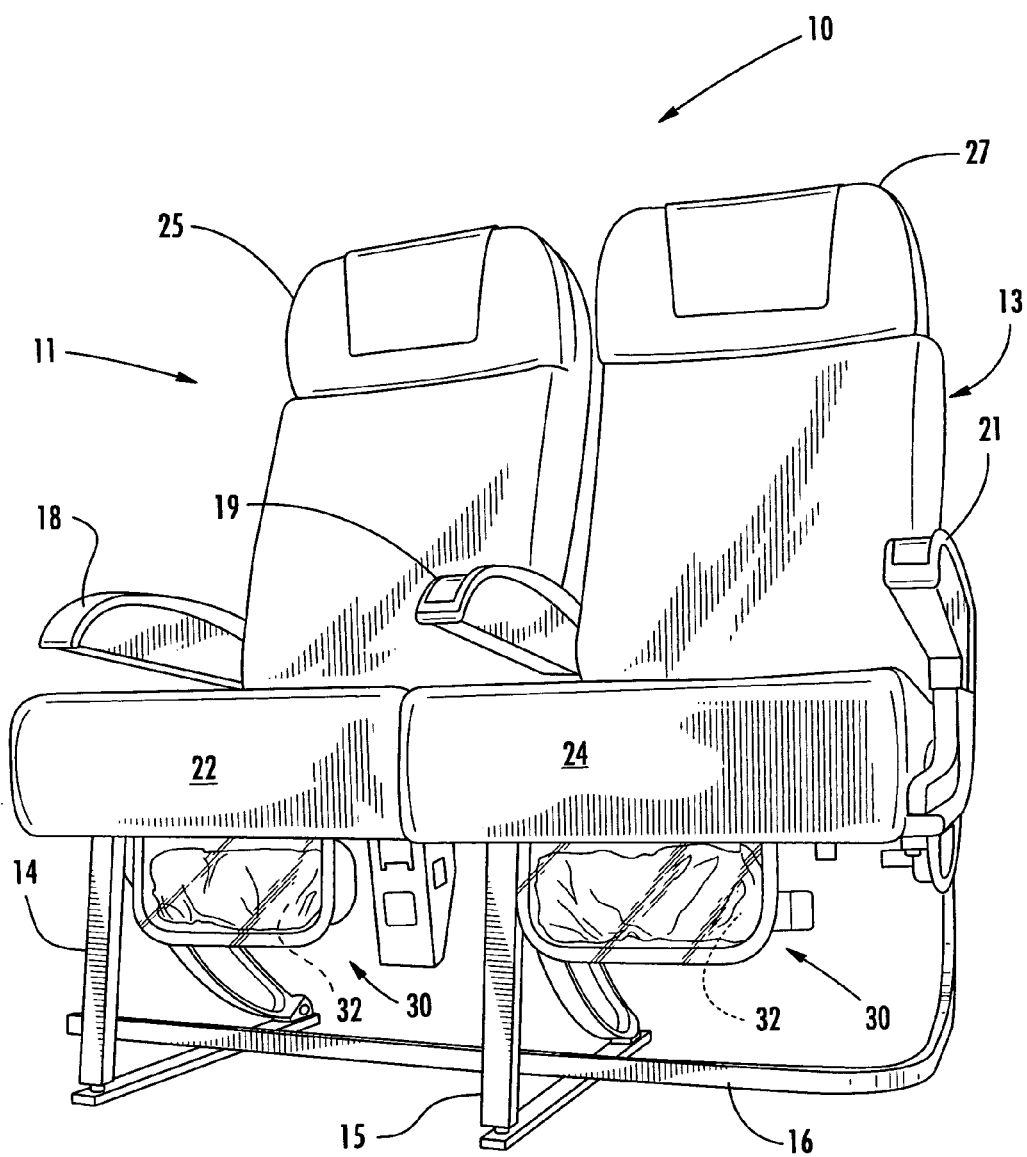
FIG. 1 is a perspective view of a seat set including a life jacket container assembly constructed in accordance with the present invention.

Referring to the drawings wherein identical reference numerals denote the same elements throughout the various views, an aircraft passenger seat set according to the present invention is illustrated in FIG. 1 and shown generally at reference numeral 10. In the particular embodiment shown in FIG. 1, the seat set 10 is composed of two adjacent seats, 11 and 13. The seat set 10 is supported on a pair of leg modules 14 and 15, and includes a baggage guard rail 16. The leg modules are connected by at least one laterally-extending transverse beam 50 (see FIG. 2) having an external surface, which may be curved as shown. The seats 11 and 13 are provided with arm rests 18, 19 and 21. The seats 11 and 13 include seat bottoms 22 and 24, respectively, and seat backs 25 and 27, respectively. A secure life jacket container assembly 30 is disposed under each seat 11 and 13. Each container assembly 30 encloses a life jacket 32 or other type of flotation device stored in a packed condition.

Figure 4:
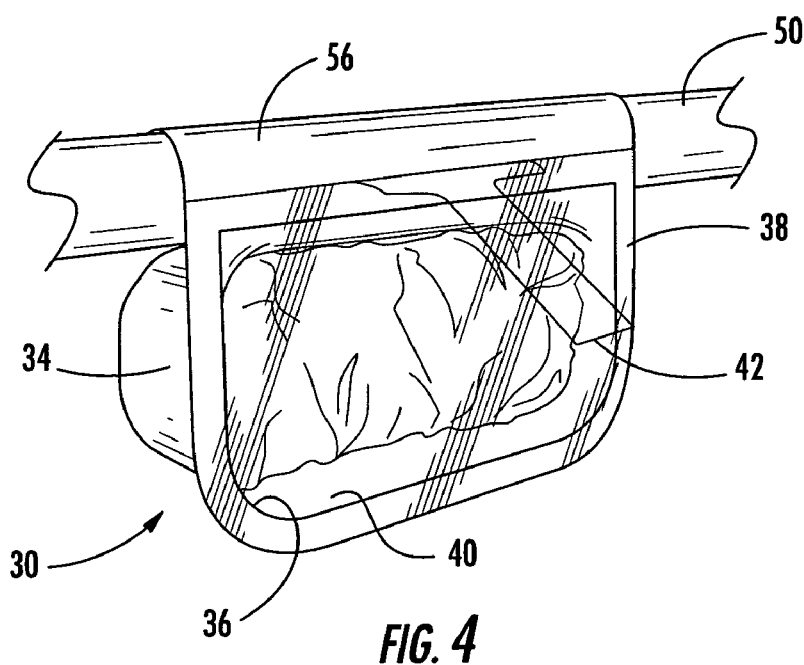
FIG. 4 is a perspective view of a portion of a seat frame showing another alternate manner of attaching a life jacket container assembly thereto.

FIG. 4 illustrates a container assembly 30 constructed according to the invention. The container assembly 30 includes a hollow container 34 defining a storage volume and having an opening 36. The container 34 may be formed from any lightweight, impermeable material such as sheet metal or plastic. The container 34 may be formed as a unitary component, for example by vacuum molding or injection molding in a known manner. The container 34 includes a generally planar, outward-extending lip 38 disposed a round the perimeter of the opening 36. In the illustrated example, the container 34 is opaque. However, if desired, all or part of the container 34 may be made translucent or transparent to allow viewing of the life jacket 32 inside, and also to discourage theft of the life jacket 32, since it would be immediately obvious if it were missing from the container 34.

A cover 40 is attached to the container 34. The cover 40 encloses the opening 36, which protects the life jacket 32 from environmental conditions such as dust and liquids, and discourages tampering with or theft of the life jacket 32. The cover 40 may take different forms. In the example illustrated in FIG. 4, the cover 40 comprises a planar, flexible, transparent membrane constructed of plastic or similar material and of the same approximate shape and size as the lip 38 of the container 34, which is attached around its perimeter to the lip 38. Because the cover 40 is transparent, it allows observation of the life jacket 32, so that identifying information (such as a serial number or expiration date) can be readily observed, and so that the status of the sealing material 62 (described below) can be observed without having to remove the cover 40 The cover 40 also includes an integral handle 42 to be used in removing the cover 40 from the container 34.

Figure 5:
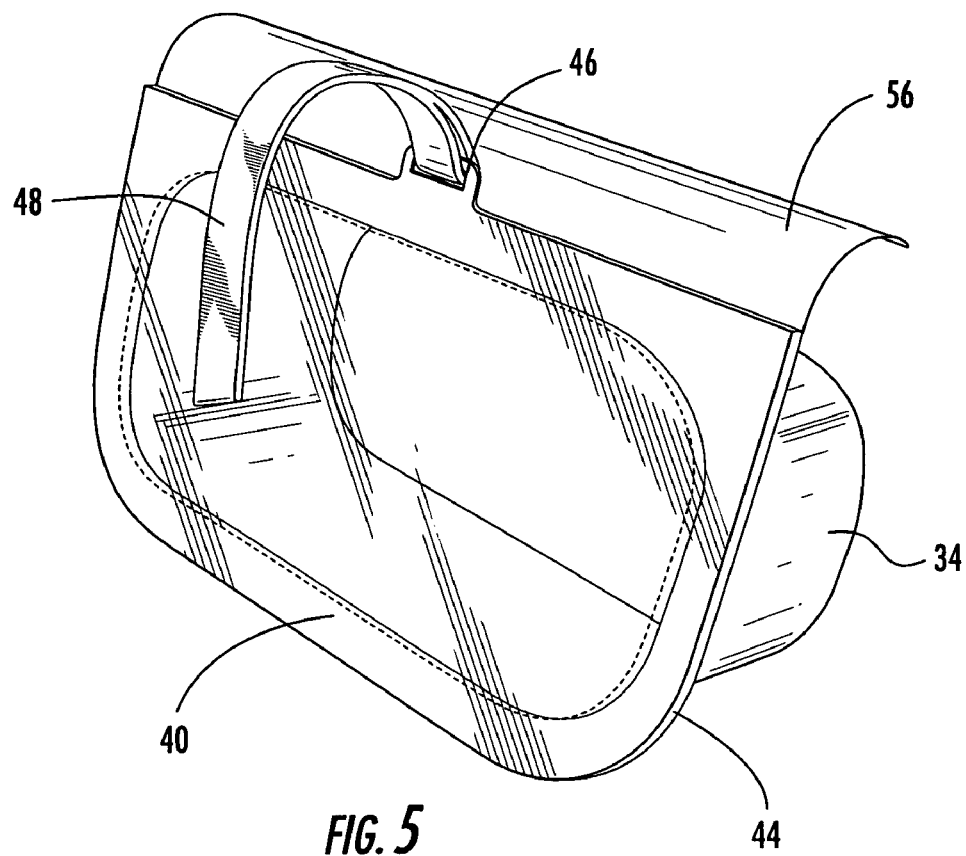
FIG. 5 is a perspective view of a life jacket container assembly constructed in accordance with the present invention.

FIG. 5 illustrates a container assembly 30 having a slightly different cover 40. The cover 40 is a substantially rigid, planar body, optionally including an upstanding edge 44 around its perimeter which helps locate and seal the cover 40 to the container 34. The cover 40 includes a mounting slot 46 to which a handle 48 (for example a length of nylon webbing) is attached. The cover 40 is made of translucent or transparent material which allows observation of the life jacket 32, so that identifying information (such as a serial number or expiration date) can be readily observed, and so that the status of the sealing material 62 (described below) can be observed without having to remove the cover 40.

Figure 2:
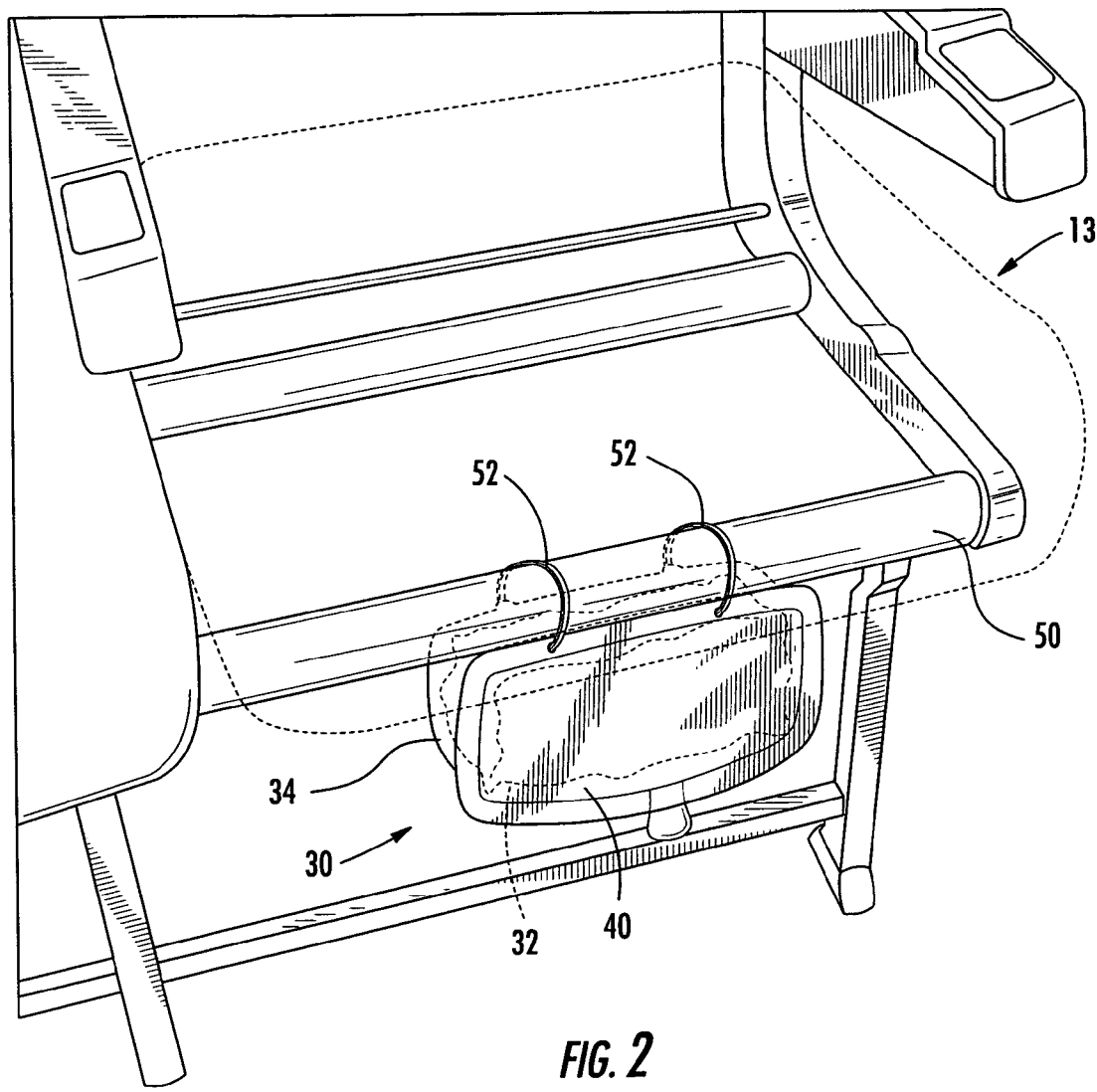
FIG. 2 is a perspective view of a seat frame assembly showing a life jacket container assembly attached thereto.
Figure 3:
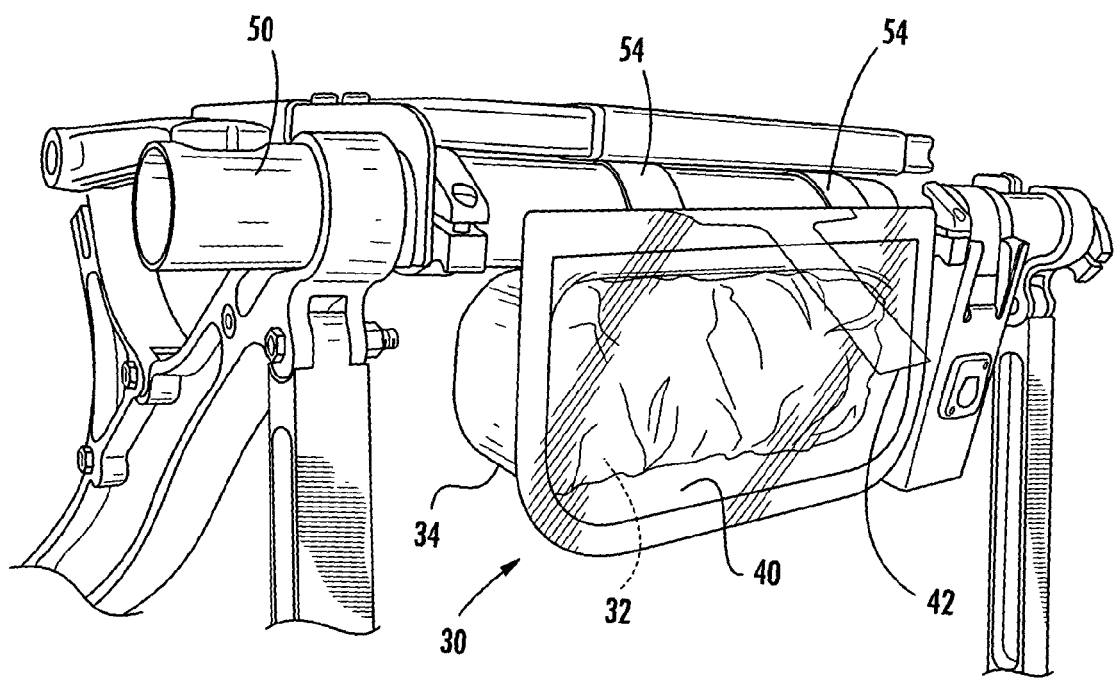
FIG. 3 is a perspective view of a portion of a seat frame showing an alternate manner of attaching a life jacket container assembly thereto.

FIGS. 2, 3, and 4 show different methods by which the container assembly 30 may be mounted to the aircraft seat set 10. As shown in FIG. 2, the container assembly 30 may be secured to the transverse beam 50 by mounting straps 52. The mounting straps 52 may be similar to plastic cable ties, which are wrapped around the transverse beam 50 and then attached at their ends to the container assembly 30. FIG. 3 shows a variation in which relatively flat mounting bands 54 are wrapped around the transverse beam 50 and then attached to the container assembly 30, for example with adhesive, fasteners, or hook-and-loop material (not shown). FIG. 4 shows yet another variation in which the container assembly includes a radiused, laterally-extending mounting flange 56 which conforms to the surface of the transverse beam 50, and may be attached to the transverse beam 50 as described above. It is noted that the exact location and the particular mounting method is not critical to the operation of the present invention and may be altered as desired to suit a particular application.

Figure 9:
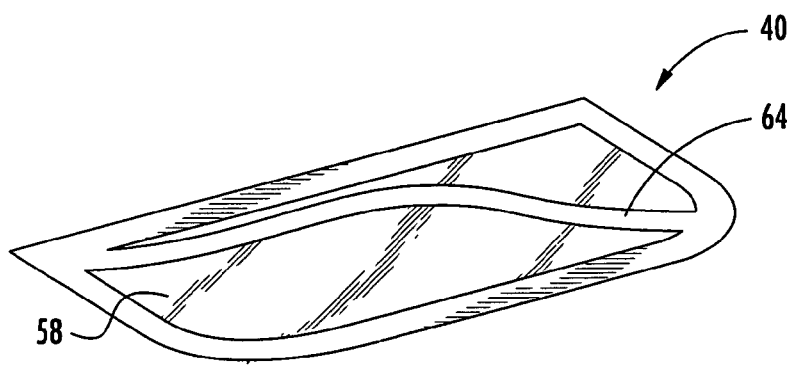
FIG. 9 is a perspective view of a cover for a life jacket container assembly.
Figure 10:
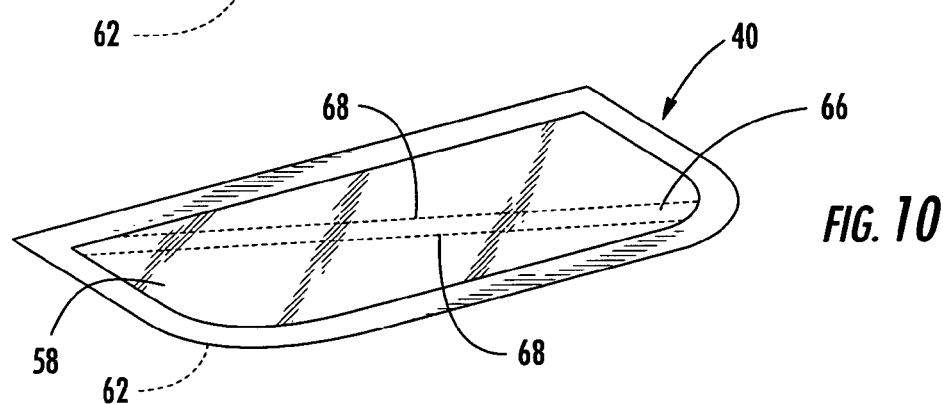
FIG. 10 is a perspective view of an alternate cover for a life jacket container assembly.
Figure 11:
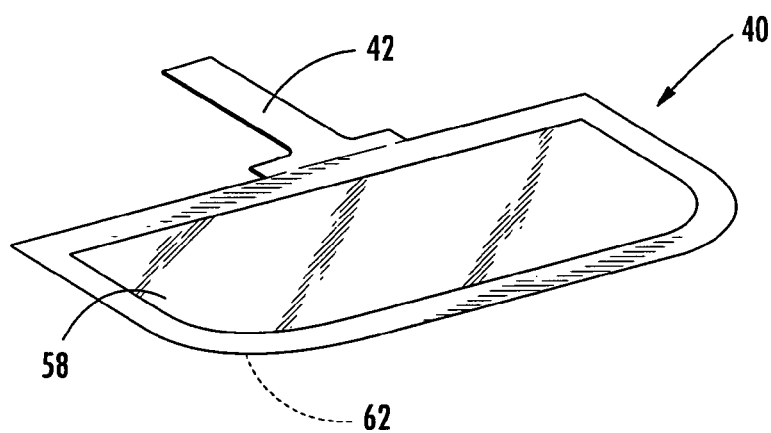
FIG. 11 is a perspective view of another alternate cover for a life jacket container assembly.
Figure 12:
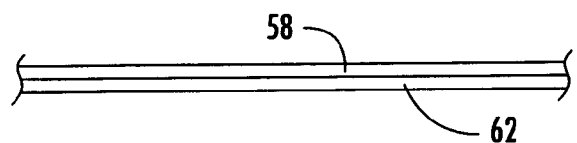
FIG. 12 is a side view of the construction of a cover for a life jacket container assembly.

FIGS. 9, 10, and 11 illustrate several possible variations of the cover 40. In this case, the cover 40 includes a first layer which is an impermeable membrane 58 and a second layer made from a sealing material 62 (see FIG. 12). Because the sealing material 62 is relatively expensive, the amount of sealing material 62 used is minimized by applying it to the membrane 58 only around the perimeter where the cover 40 is to be attached to the container 34. A handle is also provided for opening the cover 40 when necessary. FIG. 9 shows a variation in which the handle comprises a flat strap 64 attached to the membrane 58, for example by gluing a third layer of material to the membrane-sealing material layered structure. FIG. 10 shows a variation in which the handle is a perforated strap 66 that is made integral with the membrane 58. To use the strap 66, it is torn along the perforated lines 68 and pulled upward. Finally, FIG. 11 shows a cover 40 in which the handle 42 is made integrally with the membrane 58, by simply including the shape of the handle 42 in the pattern when the cover 40 is cut or otherwise formed.

Figure 13:
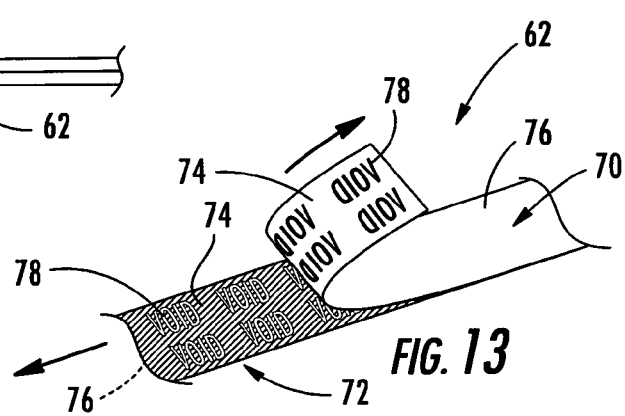
FIG. 13 is a perspective view of an exemplary tamper-evident sealing material.

FIG. 13 shows an exemplary tamper-evident sealing material 62. The exemplary sealing material 62 includes a first layer 70 and a second layer 72. Each of the first and second layers 70 and 72 has an internal surface 74 and an external surface 76. When the sealing material 62 is ready for use, the internal surfaces 74 are adhered together as part of an integral structure. In the illustrated example, each of the external surfaces 76 is coated with a suitable adhesive (not shown). The properties of the sealing material 62 are chosen such that, when two objects are sealed together with the sealing material 62, and an attempt is made to separate the two objects, the first and second layers 70 and 72 will remain attached to their respective objects and will pull apart from each other. When the first layer 70 is pulled away from the second layer 72, the internal surfaces 74 are irreversibly changed in a distinct manner, thus giving evidence of tampering. In the illustrated example, a pattern of indicia 78 such as the word "void" is visible in one or both of the first and second layers 70 and 72. Any sealing material 62 which is capable of indicating tampering may be used with the container assembly 30. Many sealing materials of this type are commercially available, which operate in various ways. For example, a physical or a chemical change or both may occur in the sealing material to evidence tampering. The exact principle of operation is not important for the present invention, so long as tampering is disclosed.

FIGS. 7 and 8 illustrate how the container assembly 30 may be put together. FIG. 7 shows the assembly sequence for a separate cover 40 and sealing material 62. The packed life jacket 32 is placed into the container 34. The sealing material 62 is attached to the lip 38 of the container 34, and then cover 40 is attached to the sealing material 62. The sealing material 62 and the cover 40 could be attached to the container 34 in a number of different ways. For example, the sealing material 62 could be provided with adhesive already applied to both sides, in which case the sealing material 62 would be simply pressed onto the enclosure lip 38 and interior of the cover 40. Alternatively, a separate adhesive (not shown), for example a brush-on or sprayable adhesive, could be applied to the cover 40, sealing material 62, and container 34 before assembly.

FIG. 8 shows the manner of assembly when a cover 40 having an integral sealing material (of the type shown in FIGS. 9-12) is used. In this case, the cover 40 already includes the sealing material 62 disposed about its perimeter. To complete the assembly, the packed life jacket 32 is simply placed inside the container 34 and then the cover 40 is secured to the lip 38 of the container.

Figure 6:
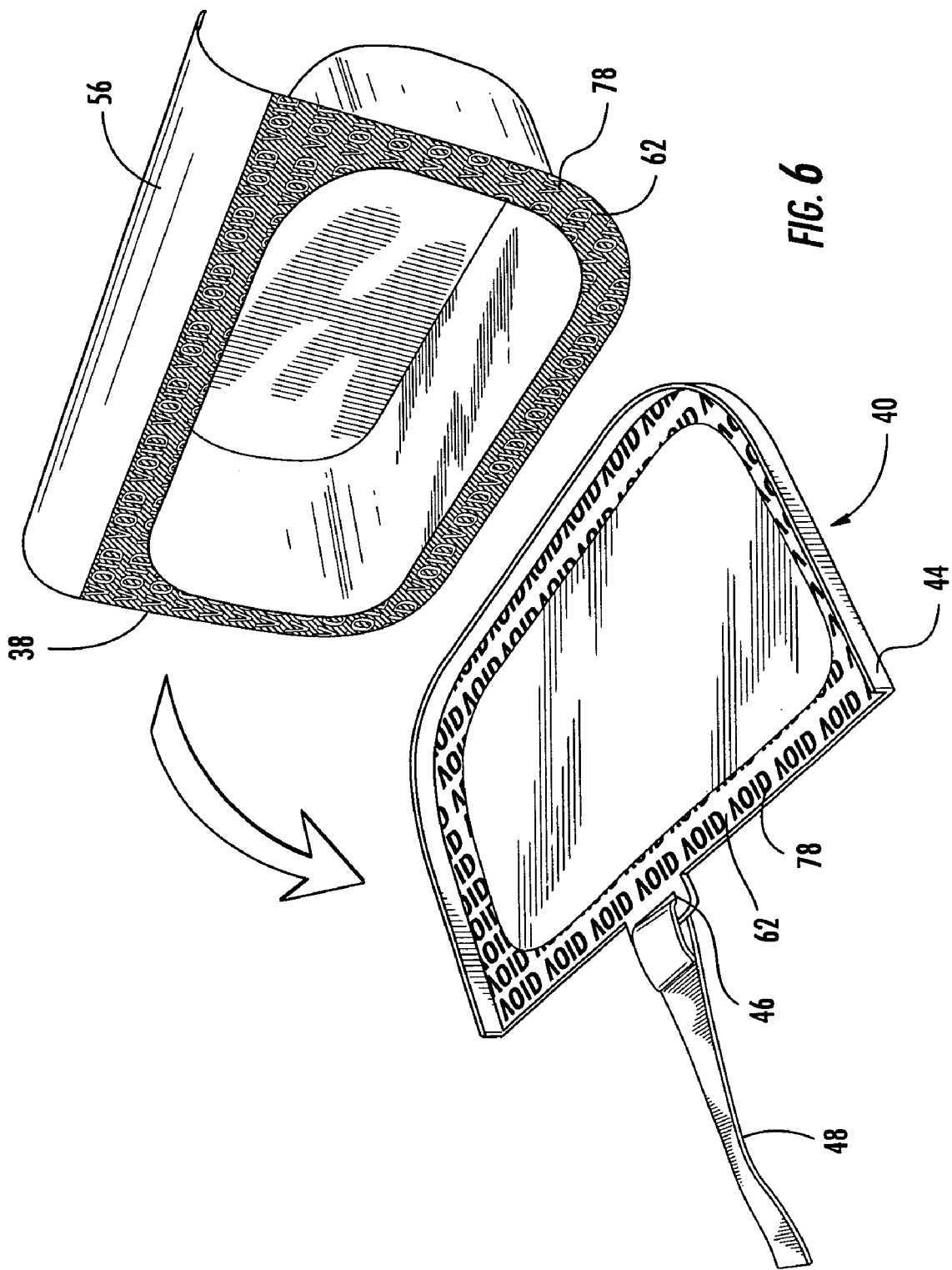
FIG. 6 is view of the life jacket container assembly of FIG. 5 in an opened condition.

FIG. 6 illustrates the tamper-evident properties of the container assembly 30. The cover 40 has been pulled away from the container 34, causing the indicia 78, such as the word "void" or any other selected symbol or phrase, to be displayed in the sealing material 62. This is a clear, irreversible indication that the container assembly 30 has been opened, alerting service personnel that the life jacket (if still present) may have been tampered with and should be inspected. Even if the cover 40 is replaced, the sealing material 62 will still show evidence of tampering. The transparent or translucent nature of the cover 40 allows easy observation of the status of the sealing material even while the cover 40 is attached. The fact that the container assembly 30 is tamper-evident serves as a deterrent feature, both to prevent thieves from stealing the life jacket 32, and to stop terrorists from inserting weapons or illegal objects into the container 24 unnoticed.

The foregoing has described a secure life jacket container assembly including a hollow container, and a cover attached to the container with a tamper-evident sealing material. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation—the invention being defined by the appended claims.

What is claimed is:

1. A tamper-evident life jacket container assembly, comprising:
    a hollow container adapted for receiving a flotation device, said container having an opening;
    a flotation device disposed inside of said container;
    a tamper-evident sealing material secured around the opening of said container; and
    a cover secured to said tamper-evident sealing material and enclosing said opening of said container; such that removal of said cover causes said sealing material to change in a manner to provide an observable indication that said cover has been removed;
    wherein said container is adapted to be mounted underneath a seat such that said opening is directly accessible for inspection and removal of said cover without substantial movement of said container.

2. The tamper-evident life jacket container assembly of claim 1, wherein said container is a molded plastic one-piece assembly having an outwardly-extending lip disposed around the perimeter of said opening.

3. The tamper-evident life jacket container assembly of claim 2, wherein said container includes a laterally-extending arcuate mounting flange extending from said lip.

4. The tamper-evident life jacket container assembly of claim 1, wherein said cover is a generally planar membrane.

5. The tamper-evident life jacket container assembly of claim 4, wherein said cover includes a handle formed integrally therewith.

6. The tamper-evident life jacket container assembly of claim 1, wherein said cover is a substantially rigid, planar cover.

7. The tamper-evident life jacket container assembly of claim 6, wherein said cover includes a handle attached thereto.

8. The tamper-evident life jacket container assembly of claim 6, wherein said cover has an upstanding edge disposed around its outer perimeter.

9. The tamper-evident life jacket container assembly of claim 1, wherein said sealing material comprises a flexible material having first and second layers attached to said cover and to said container, wherein separation of said cover from said container causes said first and second layers to separate from each other while said first layer remains attached to said cover and said second layer remains attached to said container.

10. The tamper-evident life jacket container assembly of claim 9, wherein said separation of said first and second layers causes an indicia to be visible in at least one of said first and second layers.

* * * * *